(12) United States Patent
Swannie (10) Patent No.: US 7,341,264 B2
(45) Date of Patent: Mar. 11, 2008

(54) TRAILER HITCH MOUNTED REVERSE SENSING SYSTEM

(76) Inventor: Mark Swannie, 95-492 Awiki St., Mililani, HI (US) 96789

( * ) Notice: Subject to any disclaimer, the term of this patent is extended or adjusted under 35 U.S.C. 154(b) by 286 days.

(21) Appl. No.: 10/976,309

(22) Filed: Oct. 29, 2004

(65) Prior Publication Data

US 2005/0104322 A1 May 19, 2005

Related U.S. Application Data (60) Provisional application No. 60/516,407, filed on Oct. 30, 2003.

(51) Int. Cl.
*B60R 3/00* (2006.01)

(52) U.S. Cl. ............... 280/164.1; 340/431; 340/435

(58) Field of Classification Search ............ 280/477, 280/761, 491.1, 494.1, 495, 163, 164.1, 500, 280/501, 153, 432; 180/199; 340/431, 435, 340/436

See application file for complete search history.

(56) References Cited

U.S. PATENT DOCUMENTS

| | | | |
|---|---|---|---|
| 3,614,136 A * | 10/1971 | Dent | 280/500 |
| 3,732,555 A | 5/1973 | Strenglein | |
| 4,450,430 A * | 5/1984 | Barishpolsky et al. | 340/904 |
| 5,059,946 A | 10/1991 | Hollowbush | |
| 5,455,557 A * | 10/1995 | Noll et al. | 340/431 |
| 5,572,484 A * | 11/1996 | Gaus et al. | 367/99 |
| 5,574,426 A | 11/1996 | Shisgal et al. | |
| 5,666,103 A | 9/1997 | Davis, Jr. | |
| 5,777,563 A | 7/1998 | Minissale et al. | |
| 5,861,814 A | 1/1999 | Clayton | |
| 5,914,652 A | 6/1999 | Adamo | |
| 6,037,726 A * | 3/2000 | Tabata et al. | 318/139 |
| 6,133,826 A | 10/2000 | Sparling | |
| 6,181,645 B1 | 1/2001 | Li | |
| 6,217,200 B1 | 4/2001 | Huffman | |
| 6,339,369 B1 | 1/2002 | Paranjpe | |
| 6,370,086 B2 | 4/2002 | Li | |

(Continued)

FOREIGN PATENT DOCUMENTS

GB 2344481 A 6/2000

*Primary Examiner*—Lesley D. Morris
*Assistant Examiner*—Maurice Williams
(74) *Attorney, Agent, or Firm*—Shlesinger, Arkwright & Garvey LLP (57) ABSTRACT

A trailer hitch-mounted reverse sensing device for a vehicle for indicating to the driver an object behind the vehicle comprises a housing with an extension extending from the housing. The extension is configured to be removably received within a receiver of a towing hitch. The housing includes a front face having a central portion, and first and second end portions. The first and second portions are angled such that a line transverse to either the first or second end portions is directed toward the centerline of the vehicle between the front and rear of the vehicle. First and second sensors are disposed in respective first and second end portions and directed toward the rear of the vehicle along the transverse line. A control module is disposed within the housing and operably connected to the sensors to determine the distance of the object sensed by the sensors. An indicator is operably connected to the control module and activated by the control module to provide an indication of distance to the object sensed by the sensors at the rear of the vehicle.

18 Claims, 6 Drawing Sheets

U.S. PATENT DOCUMENTS

| | | |
|---|---|---|
| 6,400,308 B1 | 6/2002 | Bell et al. |
| 6,446,998 B1 * | 9/2002 | Koenig et al. ............... 280/432 |
| 6,491,315 B2 * | 12/2002 | Hagen et al. ............ 280/164.1 |
| 6,535,116 B1 | 3/2003 | Zhou |
| 6,542,085 B1 | 4/2003 | Yang |
| 6,654,670 B2 * | 11/2003 | Kakinami et al. .............. 701/1 |
| 6,693,520 B2 | 2/2004 | Li |
| 6,710,302 B1 | 3/2004 | Rennick |
| 6,719,318 B1 | 4/2004 | Blake |
| 6,788,190 B2 * | 9/2004 | Bishop ....................... 340/435 |
| 6,879,248 B2 * | 4/2005 | Flick .......................... 340/435 |
| 6,879,914 B2 * | 4/2005 | Hoenes et al. .............. 701/301 |
| 6,925,370 B2 * | 8/2005 | Smith et al. ................... 701/36 |
| 7,046,127 B2 * | 5/2006 | Boddy ........................ 340/435 |
| 7,053,794 B2 * | 5/2006 | Tanaka et al. ........... 340/932.2 |
| 2003/0141965 A1 | 7/2003 | Gunderson et al. |
| 2005/0024191 A1 | 2/2005 | Boddy |
| 2006/0091637 A1 * | 5/2006 | Knittel ........................ 280/163 |

* cited by examiner

TRAILER HITCH MOUNTED REVERSE SENSING SYSTEM

RELATED APPLICATIONS

This application claims the priority benefit of provisional application Ser. No. 60/516,407, filed Oct. 30, 2003, hereby incorporated by reference.

FIELD OF THE INVENTION

The present invention relates generally to a warning device that indicates the proximity of an obstructing object behind a vehicle moving in the reverse direction and particularly to a reverse sensing device that mounts to a standard trailer hitch.

BACKGROUND OF THE INVENTION

Each year, there are over 300,000 reported reversing accidents, costing in excess of $1.3 billion, including out of pocket expenses not covered by insurance, increased premiums after an accident, time wasted in getting the vehicles repaired, not to mention the intangible loss of knowing that a repaired vehicle is not the same as one prior to the accident. There is, therefore, a need for a device that would warn a driver of an obstructing object behind the vehicle as the car reverses.

OBJECTS AND SUMMARY OF THE INVENTION

It is an object of the present invention to provide a reverse sensing device that aids in maneuvering in tight parking spaces.

It is another object of the present invention to provide a reverse sensing device that gauges the distance to an obstructing object, such as another vehicle, post, tricycle, person, etc. behind the vehicle.

It is still another object of the present invention to provide a reverse sending device that shows an image of an obstructing object behind the vehicle and its distance.

It is another object of the present invention to provide a reverse sending device that quickly mounts to a trailer-hitch, thereby making it easy to remove the device when the trailer-hitch is to be used for towing.

It is an object of the present invention to provide a reverse sensing device that includes its components within a water-tight housing.

In summary, the present invention provides a trailer hitch-mounted reverse sensing device for a vehicle for indicating to the driver an obstructing object behind the vehicle, comprising a housing with an extension extending from the housing. The extension is configured to be removably received within a receiver of a standard trailer hitch. The housing includes a front face having a central portion, and first and second end portions. The first and second portions are angled such that a line transverse to either the first or second end portions is directed toward a longitudinal axis of the vehicle between the front and rear of the vehicle. First and second sensors are disposed in respective first and second end portions and directed toward the rear of the vehicle. A control module is disposed within the housing and operably connected to the sensors to determine the distance of the object sensed by the sensors. An indicator is operably connected to the control module. The indicator is activated by the control module to provide an indication of distance to the object sensed by the sensors at the rear of the vehicle.

These and other objects of the present invention will become apparent from the following detailed description.

DETAILED DESCRIPTION OF THE INVENTION

Figure 1:
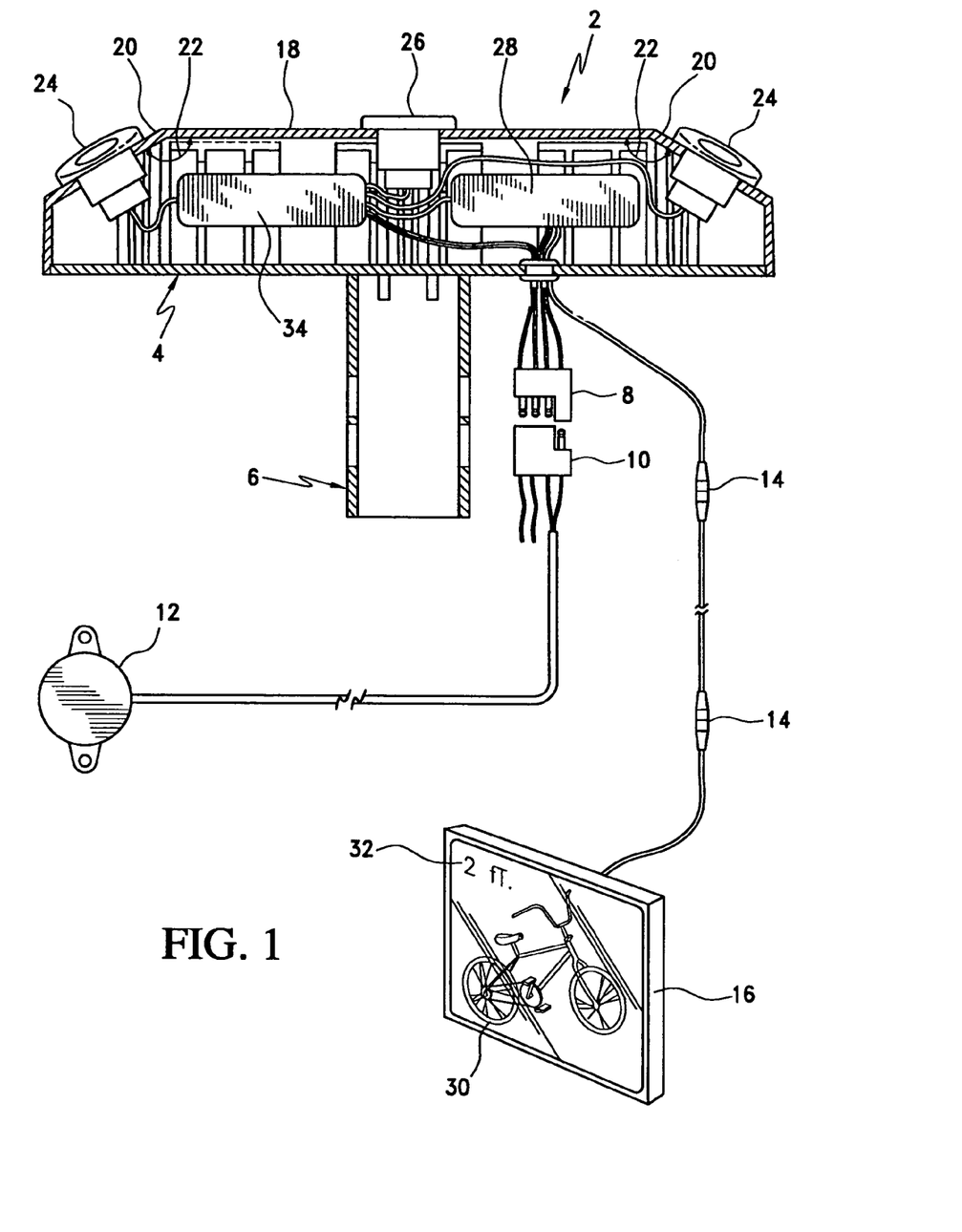
FIG. 1 is a cross-sectional top plan view of a trailer hitch-mounted reverse sensing device made in accordance with the present invention.

A reverse sensing device 2 for motor vehicles is disclosed in FIG. 1. The device 2 includes a housing 4 and an extension 6 removably receivable within a receiver of a towing hitch of the vehicle. The housing 4 is advantageously water-tight to protect the electronic components within the housing from the weather. The extension 6 is configured to be received within a standard trailer hitch receiver and is easily removable when the trailer hitch is to be used for towing a trailer. The electronic components of the device 2 within the housing 4 are operably connected to the back up light power supply wire of the vehicle through a connector 8 that connects with a mating connector 10. A buzzer 12 is also operably connected to the components through the connectors 8 and 10. Another set of connectors 14 operably connect the components to a display monitor 16. When the vehicle is placed in reverse, the backup light is energized, thereby also energizing the device 2. When the vehicle is placed in drive, the power to the backup light is turned off, thereby turning off the device. Other power sources may be used that turns on when the vehicle is put in reverse and turned off in drive.

The buzzer 12 is preferably disposed within the vehicle within hearing distance of the driver.

The housing 4 is substantially rectangular with a front central face 18 substantially transverse to the centerline of the vehicle and opposite beveled or angled end faces 20 that form an angle 22, preferably about 150 degrees, with the front face 18. Sensors 24 are advantageously positioned on the angled end faces 20 to provide a wider horizontal area of coverage in which an obstructing object, such as a low post, another vehicle, a person, etc. behind the vehicle may be detected. Although the front face of housing 4 is disclosed as angular, it may also be continuously curved, with a normal line to the central portion being parallel to the centerline of the vehicle, and a normal line to the end portions making an angle of about 30 degrees with the vehicle centerline.

The sensors 24 are transceivers, preferably ultrasonic-type, but other standard sensors well known to a person skilled in the art may also be used. A camera 26 operably connected to the display monitor 16 may be mounted on the central face 18 to advantageously provide additional coverage of the area behind the vehicle for added safety. A standard on-screen display module 28 may be provided to allow the sensor detection distance numerical value to be overlaid on the display monitor 16. For example, the driver will not only see the view behind the vehicle, such generally depicted at 30, but he will also see the distance to the object, as generally indicated at 32.

A control module 34 is operably connected to the sensors 20. The control module 34 includes a microprocessor for determining the distance of the vehicle to the object sensed by the sensors and activating the buzzer 12 to warn the driver. The buzzer 12 is activated in such a way as to provide a gauge of distance between the obstructing object and the vehicle. For example, the buzzer 12 may sound a beeping sound that increases in frequency as the vehicle gets closer to the object and finally generating a steady continuous sound when a minimum distance is reached or exceeded. The control module 34 also provides a numerical value of the distance for the on-screen display module 28 to be overlaid on the image in the display monitor 16.

Figure 2:
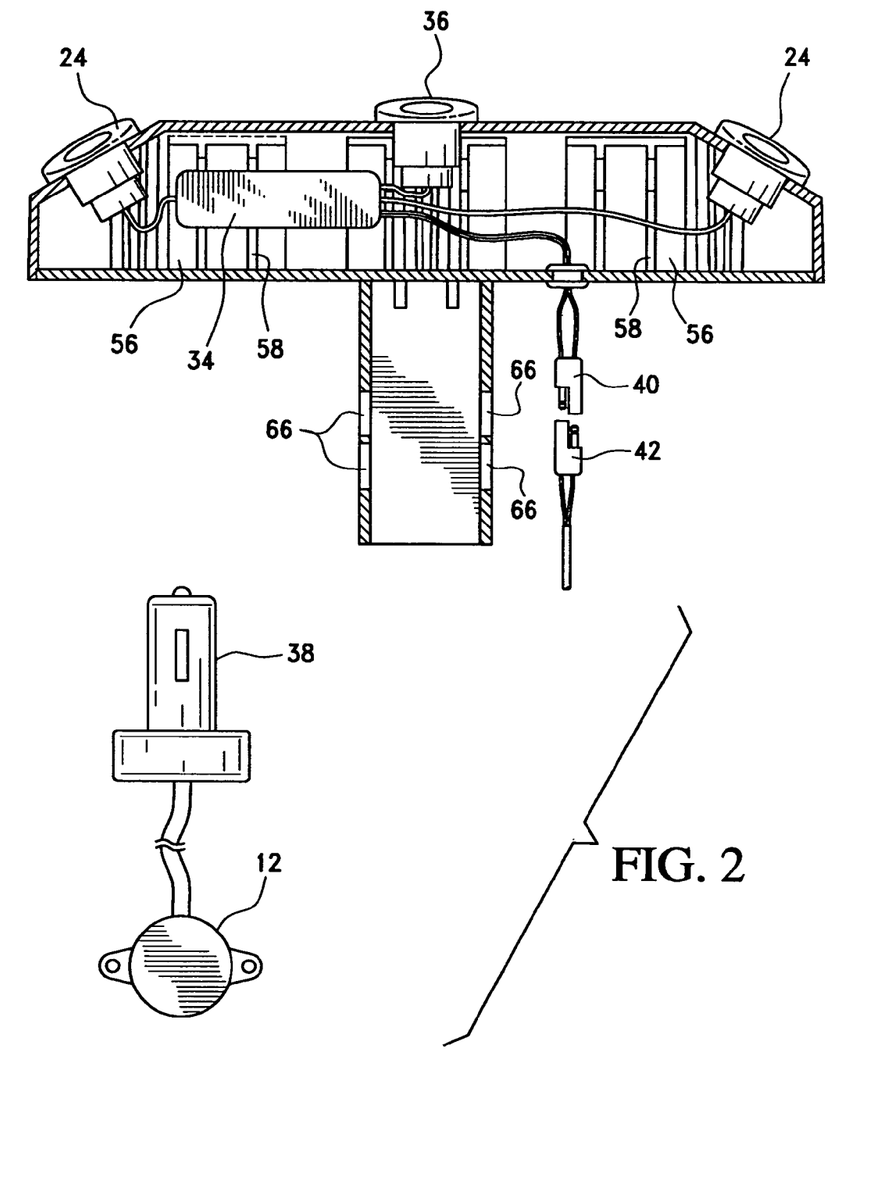
FIG. 2 is a cross-sectional top plan view of another embodiment of the present invention.

Referring to FIG. 2, the camera 26 may be replaced with another sensor 36 to provide an area of coverage larger than the two-camera embodiment of FIG. 1, without the camera 26. The buzzer 12 may be wirelessly connected to the control module 34 via a radio frequency transmitter connected the control module 34 and a receiver built into the buzzer 12. The wireless buzzer 12 is preferably powered through a plug 52 which is operably receivable in a standard vehicle cigarette lighter socket. The control module 34 is powered through the vehicle's backup light power source through mating connectors 40 and 42. The connectors 40 and 42 advantageously allow the device to be easily disconnected and removed from the trailer hitch when the trailer hitch is to be used for towing. The wireless buzzer 12 advantageously makes it convenient to switch the device to different vehicles equipped with a trailer-hitch, since the wire that normally connects the buzzer to the control module 34 will not have to be removed and reinstalled.

Figures 3, 4, 5:
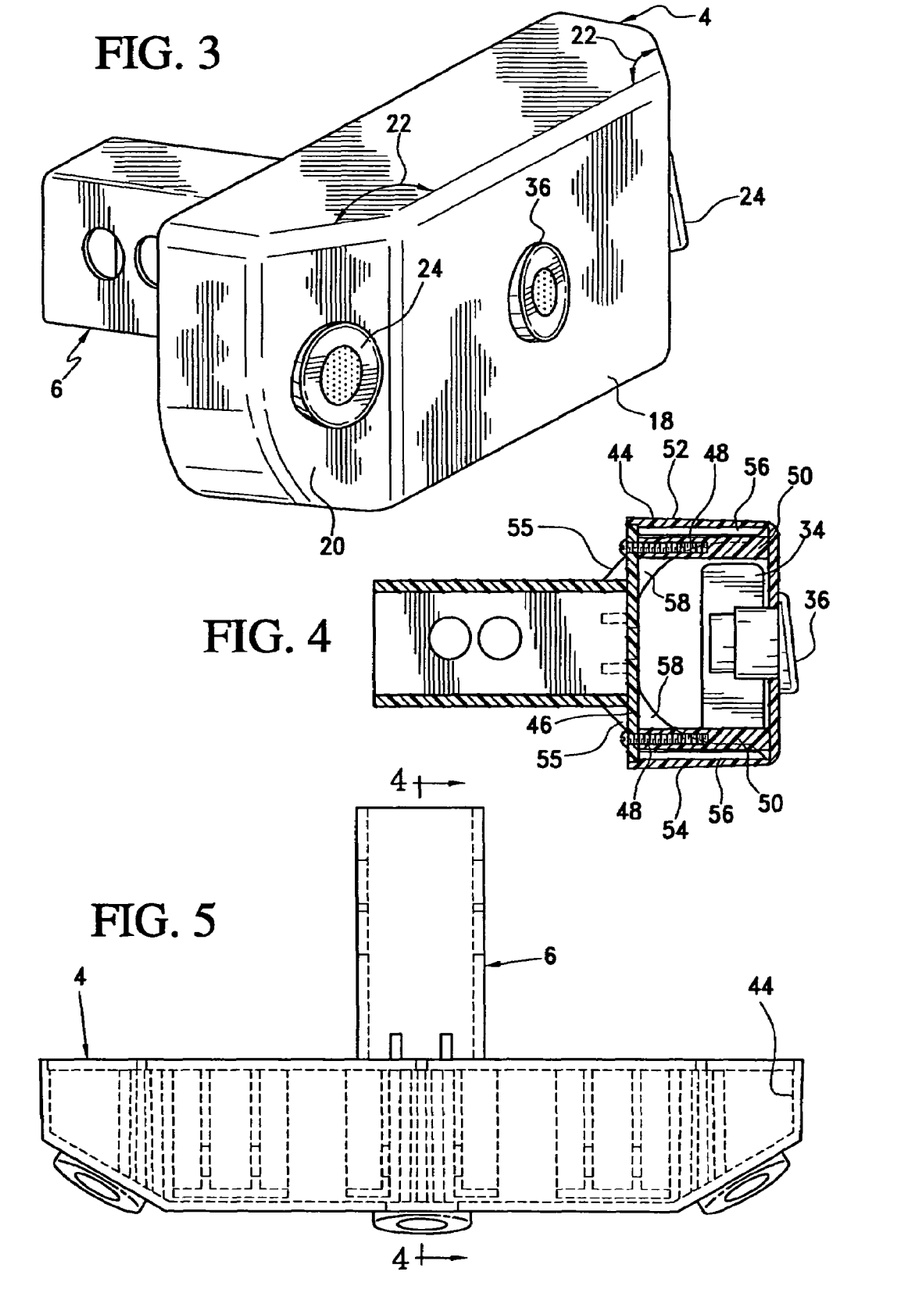
FIG. 3 is a front perspective view of the embodiment of FIG. 2.
FIG. 4 is a cross-sectional view taken along line 4-4 of FIG. 5.
FIG. 5 is a top plan view of FIG. 2.

Referring to FIGS. 3, 4 and 5, the housing 4 is substantially trough-shaped with an opening 44 enclosed by a backplate 46. The backplate 46 is attached to the housing 4 with screws 48 threadedly received within longitudinal members 50 attached to the inner surfaces of the top wall 52 and bottom wall 54 of the housing 4. The housing 4 and the longitudinal members 50 are preferably molded in one piece from plastic material. The extension 6 and backplate 46 are also preferably molded in one piece from plastic material, including reinforcing ribs 55.

Referring to FIG. 4, the sensors 24 and 36 may be installed slightly angled vertically to provide additional vertical coverage than a strictly horizontally aimed sensor.

Figure 6:
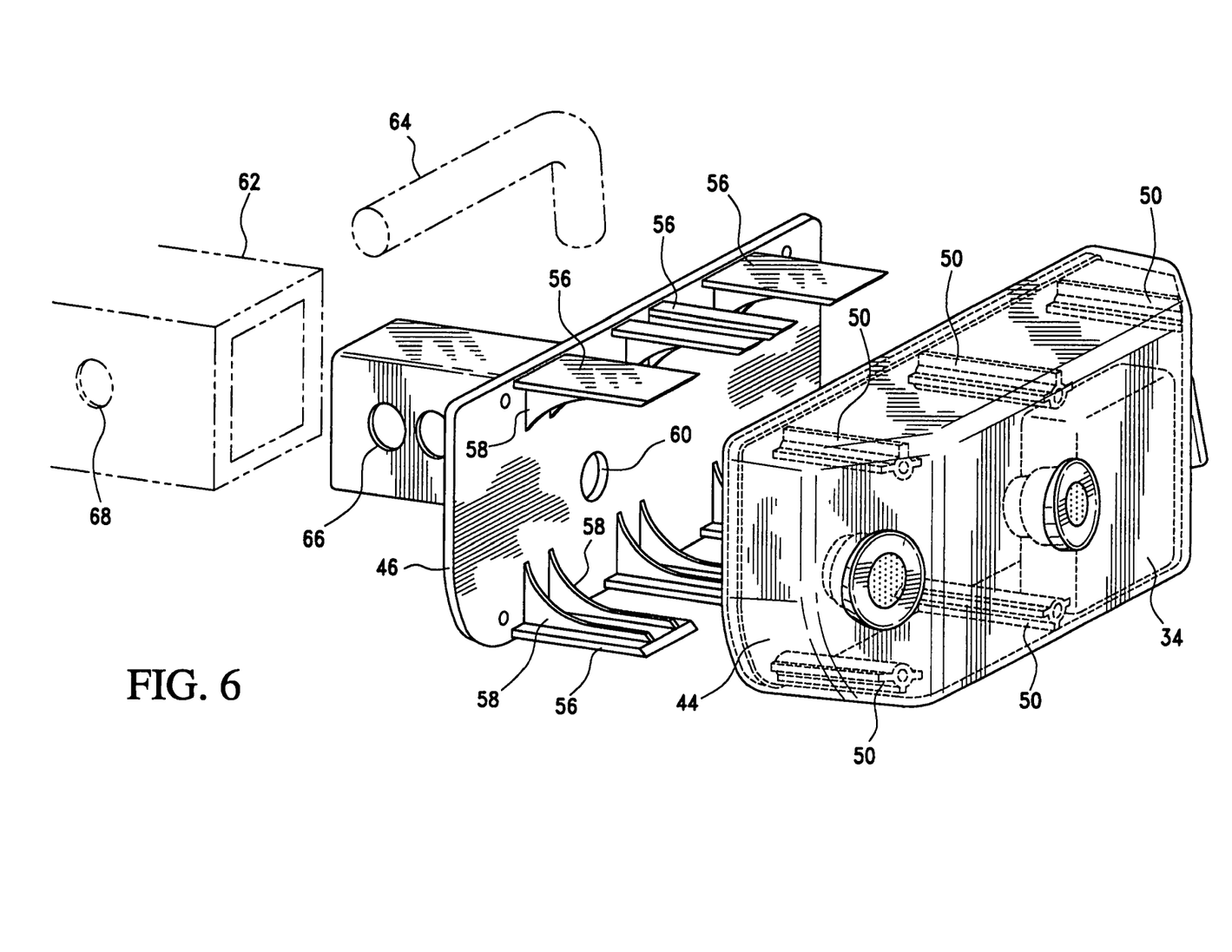
FIG. 6 is an assembly view of FIG. 3.

Referring to FIG. 6, the backplate 46 includes a plurality of members 56, preferably rectangular-shaped, extending substantially transversely from the inside surface of the backplate 46. Each member 56 is reinforced with at least one gusset 58. The members 56 advantageously provide vertical support to the top wall 52 and the bottom wall 54 so that when a person steps on the housing 4, his weight will be adequately supported. An opening 60 allows the wiring from the electrical components within the housing 4 to extend outside the housing. The housing 4 and the backplate 46 are advantageously assembled in a water-tight manner to keep the electrical components within the housing from the effects of the weather.

The extension 6 is removably received within the receiver 62 of a standard trailer-hitch. A pin 64 secures the extension 6 with the receiver 62 by aligning holes 66 with holes 68 and inserting the pin 64 through the holes.

Figure 7:
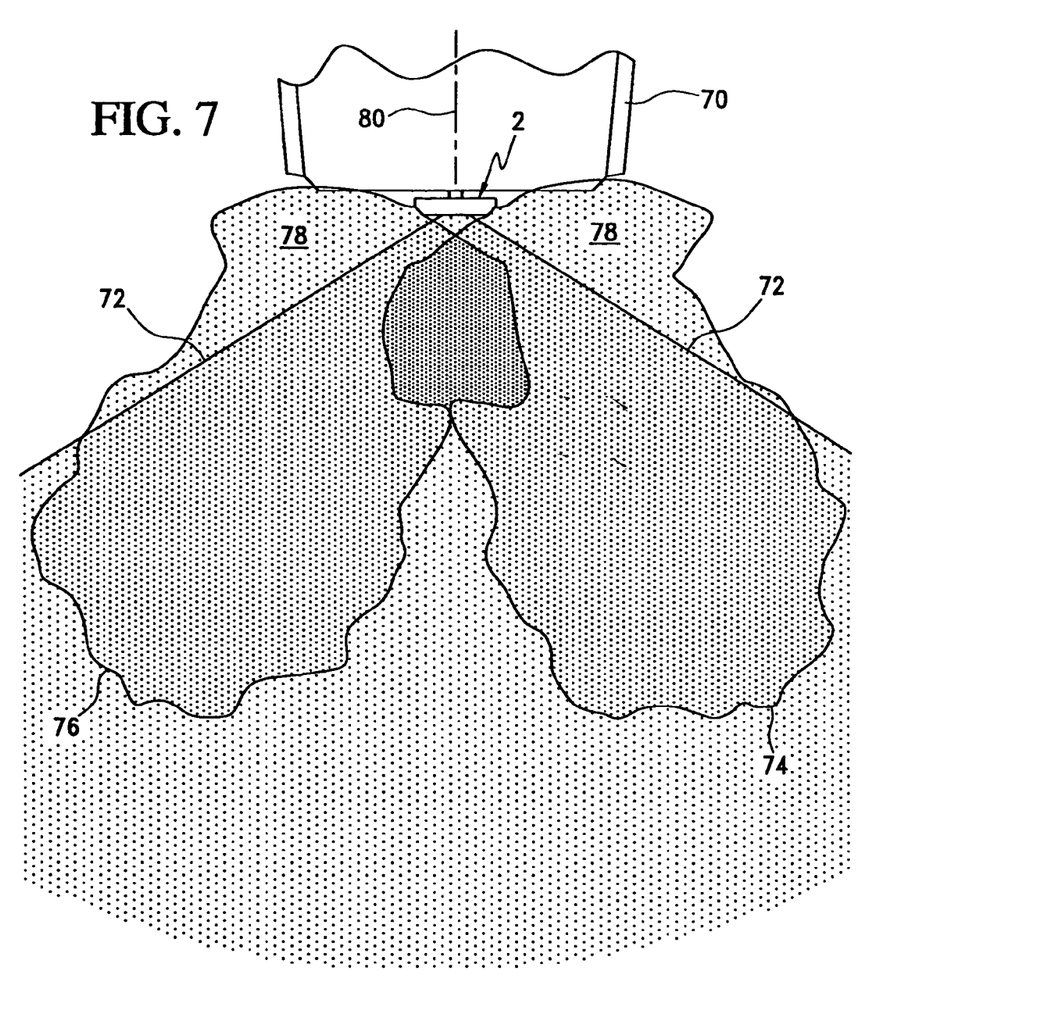
FIG. 7 shows the pattern of coverage for the device of FIG. 1.

Referring to FIG. 7, the device 2 is shown attached to the trailer hitch at the rear 70 of the vehicle. The camera 26 covers an area bounded by lines 72 while the sensors 24 cover respective areas bounded by line 74 for the right sensor and line 76 for left sensor. For areas outside the field of view of the camera, for example areas 78, the sensors 24 advantageously pick up the blind areas. Because the sensors 24 are advantageously aimed an angle with respect to the centerline (longitudinal axis) 80 of the vehicle, the coverage is increased as compared to aiming the sensors straight out the rear in line with the axis 80.

Figure 8:
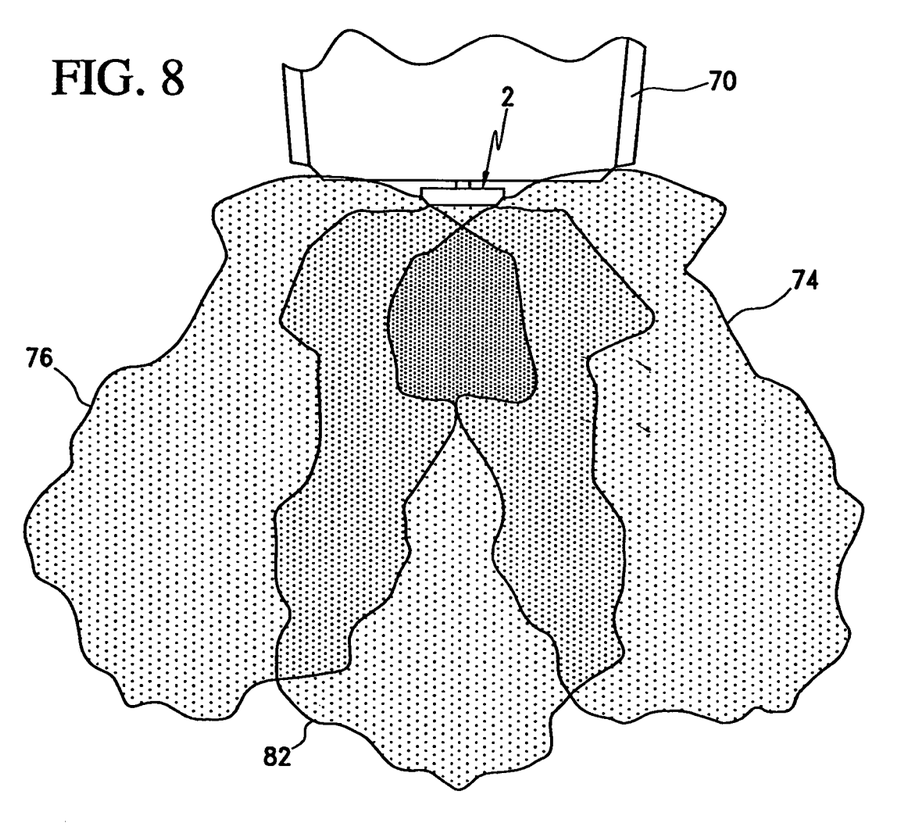
FIG. 8 shows the pattern of coverage for the embodiment of FIG. 2.

Referring to FIG. 8, the area of coverage for the three-sensor embodiment of FIG. 2 is disclosed. The right and left sensors 24 provide respective coverage areas depicted generally by lines 74 and 76, respectively, while the central sensor 36 provides an area of coverage depicted generally by line 82. With the three-sensor embodiment of FIG. 2, the blind areas normally covered by the central camera 22 is covered by the central sensor 36.

In operation, when the vehicle is placed in reverse, the control module 34 causes the buzzer 12 starts to make a loud beeping sound. The sensors start scanning behind the vehicle. The control module determines the distance of the vehicle to an object sensed by the sensors and causes the beeping sound to increase in frequency as the vehicle gets closer to an object sensed by the sensors, thereby providing an indication of distance to the object. For example, at approximately 6 feet, the buzzer makes a slow warning sound. At about 4 feet, the sound increases in frequency. At about 2 feet, the sound becomes a solid tone, indicating that the vehicle should stop. In this manner, by listening to the sound, the driver can gauge his distance to the obstructing object. For the embodiment of FIG. 1 that includes the camera 26 with the on-screen display module 28, in addition to the beeping sound, an image of the object and its distance to the vehicle are displayed on the monitor 16.

While this invention has been described as having preferred design, it is understood that it is capable of further modification, uses and/or adaptations following in general the principle of the invention and including such departures from the present disclosure as come within known or customary practice in the art to which the invention pertains, and as may be applied to the essential features set forth, and fall within the scope of the invention or the limits of the appended claims.

I claim:

1. A trailer hitch-mounted reverse sensing device for sensing an object behind a vehicle, comprising:
   a) a housing;
   b) an extension extending from said housing, said extension being configured to be removably received within a receiver of a towing hitch;
   c) said housing including a front face having a central portion, and first and second end portions, said first and second portions being angled such that a line transverse to either said first or second end portions is directed toward a centerline of the vehicle between the front and rear of the vehicle;
   d) first and second sensors disposed in respective said first and second end portions and directed toward the rear of the vehicle;
   e) a control module disposed within said housing and operably connected to said sensors to determine the distance of the object sensed by said sensors;

f) an indicator operably connected to said control module, said indicator being activated by said control module to provide an indication of distance to the object sensed by said sensors at the rear of the vehicle;

g) said housing including an opening at its back, said housing including top and bottom walls; and h) a cover plate configured to close said opening, said cover plate including members extending therefrom and into the interior of said housing, said members engaging said top and bottom walls, thereby to reinforce said housing when used as a step.

2. A trailer hitch-mounted reverse sensing device as in claim 1, wherein:

a) said central portion is substantially perpendicular to the centerline; and b) said first and second end portions each forms an angle of about 150 degrees with said central portion.

3. A trailer hitch-mounted reverse sensing device as in claim 1, wherein said housing is water-tight.

4. A trailer hitch-mounted reverse sensing device as in claim 1, wherein said members each includes a rectangular plate supported by a gusset.

5. A trailer hitch-mounted reverse sensing device as in claim 1, wherein said sensors are pointed at an angle away from the ground.

6. A trailer hitch-mounted reverse sensing device as in claim 1, wherein said sensors are ultrasonic.

7. A trailer hitch-mounted reverse sensing device as in claim 1, and further comprising a third sensor disposed at said central portion and directed toward the rear of the vehicle.

8. A trailer hitch-mounted reverse sensing device as in claim 1, and further comprising:

a) a camera disposed at said central portion directed toward the rear of the vehicle; and b) a monitor inside the vehicle to display an image of the object behind the vehicle.

9. A trailer hitch-mounted reverse sensing device as in claim 8, and further comprising an onscreen display module operably connected to said control module to display on said monitor a distance to the object from the rear of the vehicle.

10. A trailer hitch-mounted reverse sensing device as in claim 1, wherein said indicator is audible.

11. A trailer hitch-mounted reverse sensing device as in claim 1, wherein said indicator is disposed outside said housing.

12. A trailer hitch-mounted reverse sensing device as in claim 1, wherein said indicator is wirelessly connected to said control module.

13. A trailer hitch-mounted reverse sensing device as in claim 12, wherein said indicator is pluggable to the vehicle's cigarette lighter outlet.

14. A trailer hitch-mounted reverse sensing device as in claim 1, wherein said sensors are automatically turned on when the vehicle is reversing and automatically turned off when the vehicle is moving forward.

15. A trailer hitch-mounted reverse sensing device as in claim 1, wherein:

a) said sensors are connected to a plug disposed outside said housing; and b) said plug is connectable to the vehicles electrical power source.

16. An enclosure for a trailer hitch-mounted reverse sensing device for sensing an object behind a vehicle, comprising:

a) a water-tight housing for electrical components of the reverse sensing device;

b) an extension extending from said housing, said extension being configured to be removably received within a receiver of a towing hitch;

c) said housing including a front face having a central portion, and first and second end portions, said first and second portions being angled such that a line transverse to either said first or second end portions is directed toward a centerline of the vehicle between the front and rear of the vehicle;

d) said housing including an opening at its back to provide access to the electrical components, said housing including top and bottom walls; and e) a cover plate configured to close said opening, said cover plate including members extending therefrom and into the interior of said housing, said members engaging said top and bottom walls, thereby to reinforce said housing when used as a step.

17. An enclosure for a trailer hitch-mounted reverse sensing device as claim 16, wherein:

a) said central portion is substantially perpendicular to the centerline; and b) said first and second end portions each forms an angle of about 150 degrees with said central portion.

18. An enclosure for a trailer hitch-mounted reverse sensing device as in claim 16, wherein said members each includes a rectangular plate supported by a gusset.

* * * * *